US005752546A

United States Patent [19]

Yamashita

[11] Patent Number: 5,752,546

[45] Date of Patent: May 19, 1998

[54] FLUID CONTROL VALVES

[75] Inventor: Shigeru Yamashita, Shiga, Japan

[73] Assignee: Shimadzu Corporation, Japan

[21] Appl. No.: 713,232

[22] Filed: Sep. 12, 1996

[30] Foreign Application Priority Data

Sep. 14, 1995 [JP] Japan .................................... 7-237074

[51] Int. Cl.[6] .............................. F16K 15/02; F15B 13/08

[52] U.S. Cl. ............................ 137/540; 91/446; 137/596; 137/596.13

[58] Field of Search ................................ 91/446; 137/596, 137/540, 596.13

[56] References Cited

U.S. PATENT DOCUMENTS

| | | | |
|---|---|---|---|
| Re. 26,523 | 2/1969 | Tennis | 137/596.13 X |
| 3,455,210 | 7/1969 | Allen | 91/446 |
| 4,519,419 | 5/1985 | Petro | 91/446 X |
| 4,561,463 | 12/1985 | Brownbill et al. | 137/596.13 |

*Primary Examiner*—Gerald A. Michalsky
*Attorney, Agent, or Firm*—Majestic, Parsons, Siebert & Hsue P.C.

[57] ABSTRACT

Fluid control valves are combined to form a layered multi-directional valve, each having a high-pressure port connected to a high-pressure source, a tank port opened to a low-pressure region, an actuator port, a spool capable of connecting said actuator port selectively either to the high-pressure port or to the tank port, and a load check valve capable of blocking the passage of a fluid through the high-pressure port. The load check valve includes a poppet which encloses a spring chamber and is forwardly biased by a spring contained inside the spring chamber. The poppet is movable between a backward position and a forward position inside a valve-containing chamber which has an opening on a portion of the outer wall of the control valve but this opening is blocked by a portion of the outer wall of another similarly structured control valve. When the poppet is moved to its forward position, the poppet comes into contact with a seat disposed inside the high-pressure port to block it, but high-pressure oil on one side of the load check valve in the high-pressure port can flow into the spring chamber through an liquid inlet formed through the poppet. Grooves are formed either on the side of the poppet or on the side of the outer wall of the adjacent control valve which comes into contact with the poppet when the poppet is at its backward position.

8 Claims, 12 Drawing Sheets

FLUID CONTROL VALVES

BACKGROUND OF THE INVENTION

This invention relates to fluid control valves incorporating an improved check valve for forming a multi-directional control valve which may be used in industrial vehicles such as power shovels, as well as transporting machines such as forklifts.

A multi-directional control valve with a layered structure, formed by combining fluid control valves of similar kinds with their outer walls contacting each other, is a versatile machine part, although a drain is left on the mutually contacting surface, because no connecting parts are required and this reduces the cost, because they can be made compact and also because individual fluid control valves can be combined in many different manners. A prior art fluid control valve, which can thus be used to form a multi-directional control valve of a layered structure, will be described first with reference to FIGS. 3–7.

FIG. 3 shows schematically a multi-directional control valve of a layered structure incorporating prior art fluid control valves fb, which are 4-port switch valves of the slide-spool type (provided with a so-called slidable spool), each having a high-pressure port 1 connected to a high-pressure source P and containing a prior art load check valve 8', a tank port 2 connected to a low-pressure region T, a center bypass 3 which connects the high-pressure port 1 and the tank port 2, and a pair of actuator ports 4, 5 connected to actuators A (with load symbolically indicated by letters W). For convenience, the portion of the high-pressure port 1 on the side of the load check valve 8' towards the center bypass 3 will be referred to as "the inlet side" 1*a* and the portion thereof on the opposite side of the load check valve 8' as "the outlet side" 1*b*.

As shown more accurately in FIG. 4, the two valves fb shown schematically in FIG. 3 are assembled adjacent to each other, with a drain formed in between.

When the slidable spool 6 is moved to one side position (the right-hand side position as shown in FIG. 5), the center bypass 3 is closed, the high-pressure port 1 is connected to one of the actuator ports (the first actuator port 4) and the tank port 2 is connected to the other of the actuator ports (the second actuator port 5) such that the loads W on the actuators A are lifted. When the spool 6 is moved to the opposite side position (the left-hand side position as shown in FIG. 6), the center bypass 3 is closed, the high-pressure port 1 is connected to the second actuator port 5 and the tank port 2 is connected to the first actuator port 4 such that the loads W on the actuators A are lowered. When the spool 6 is at a middle position as shown in FIG. 7, the center bypass 3 is opened, and the actuator ports 4, 5 are blocked from the high-pressure port 1 and the tank port 2.

The load check valve 8' inside the high-pressure port 1 is for preventing backward motion of the actuators A due to a back current of oil through either of the actuator ports 4, 5 when the center bypass 3 is opened and the oil pressure drops in the high-pressure port 1. The reason for requiring the load check valve 8' will be explained next with reference to FIG. 8.

The spool 6 is provided with notches 6*a*, as shown in FIGS. 5, 6 and 7, such that it can be moved smoothly and small adjustments can be effected easily. Since oil can move through these notches 6*a*, although only to a limited extent, the ports which should theoretically be blocked are always connected to each other. For this reason, when the spool 6 is moved from one position to another, there occurs momentarily a condition (referred to as "Condition U") wherein the high-pressure port 1, the tank port 2 and one of the actuator ports 4 or 5 are connected together in a fluid-communicating relationship, that is, in the form of a single flow route. If the spool 6 is moved from the right-hand side position to the middle position in order to stop at a desired position the actuators A pushing the loads W upward when the valve is in such a condition, the actuators A will start to move backward when the oil pressure in the high-pressure port 1 becomes less than the oil pressure at the actuator port 4 due to the loads W. This backward motion will not stop until the oil pressure of the entire flow route connected in Condition U drops to the level of the oil pressure at the tank port 2. It now goes without saying that such an accident is very dangerous, and this is why a load check valve 8' must be provided inside the high-pressure port 1.

FIG. 4 is referenced next to explain how the load check valve 8' is accommodated when the two control valves fb are stacked one on top of the other. As shown in FIG. 9, there is provided between the inlet side 1*a* and the outlet side 1*b* of the high-pressure port 1 an indentation 843' which opens to the outer wall 10 of the other of the control valves fb, forming a closed chamber 84' closed by a back wall 844' which is a portion of the outer wall 10 of the other control valve fb. A poppet 81' is inserted into this indentation 843'. When the chamber 84' is maintained at a high pressure, a high-pressure fluid is prevented by the poppet 81' from flowing into the input side 1*a* but a portion thereof will flow out through the drain 9 formed between the mutually opposite outer walls 10 of the two control valves fb.

As shown in FIG. 9, the poppet 81' is movable backward and forward, comprising an approximately cylindrical body and an approximately conical front piece 811'. The front piece 811' has in front a contact surface 815' which is carefully finished. The body encloses a spring chamber 813' which connects the outlet side 1*b* of the high-pressure port 1 through a liquid inlet 812' to a back end 814' which is an annular plane formed by removing the circular bottom of the spring chamber 813' from the entire bottom surface of the body.

A spring 82' is contained in the spring chamber 813' and has one of its ends affixed to the back wall 844' and the other end in contact with the front piece 811' so as to provide a biasing force in the forward direction to the poppet 81'. The valve-containing chamber 84' includes an inlet 841', which connects to the inlet side 1*a* of the high-pressure port 1 and has a carefully finished seat 83', and an outlet 842' which connects to the outlet side 1*b* of the high-pressure port 1 and hence to the actuator port 4 or 5. The seat 83' is adapted to come into contact with the contact surface 815' of the poppet 81' as they approach each other.

Thus, the oil pressure on the inlet side 1*a* of the high-pressure port 1 ("the inlet pressure") is communicated to the front piece 811', and the oil pressure on the outlet side 1*b* of the high-pressure port 1 ("the outlet pressure") is communicated to the spring chamber 813'. In other words, the forces acting on the poppet 81' are the difference between the oil pressures on the front piece 811' and inside the spring chamber 813' and the force of the spring 82'.

When the spool 6 is moved to its right-hand side or left-hand side position in order to move the actuators A supporting the loads W, high-pressure oil Op, which enters from the inlet side 1*a* of the high-pressure port 1 through the inlet 841', pushes the poppet 81' backward against the force of the spring 82'. As the poppet 81' is pushed against the back wall 844', the load check valve 8' opens and the high-pressure oil Op flows out of the outlet 842' of the valve-containing chamber 84' through the outlet-side **1*b* of the high-pressure port 1 to the actuator port 4 or 5**, causing the actuators A to function.

If the spool 6 is slid to the middle position in order to stop the operation of the actuators A, the oil pressure on the inlet side **1*a* of the high-pressure port 1 drops gradually to the level of pressure on the outlet side 1*b* connected to the actuator port 4 or 5. At this point in time, as shown in FIG. 10, the oil pressure on the front piece 811' becomes the same as that at the back end 814' and inside the spring chamber 813' such that there should remain only the biasing force on the poppet 81', and the poppet 81' should be pushed forward by this biasing force, thereby closing the load check valve 8'** and preventing the backward flow of oil from the actuators A due to the loads.

In reality, however, there are situations where the poppet 81' fails to reach the flow-stopping position and to prevent oil from flowing backward. This is because oil leaks through the drain 9 such that, as shown in FIGS. 11A and 11B, an oil pressure lower than the outlet pressure communicated from the spring chamber 813' is applied to the back end 814'. In such a situation, the force on the back end 814' becomes weaker than the force on the front piece 811' even if the oil pressure on the inlet side **1*a* of the high-pressure port 1 becomes equal to that in the actuator port 4 or 5, there being left remaining a force pushing the poppet 81' as a whole towards the back wall 844'. If this remaining force is greater than the force of the spring 82', the poppet 81' fails to move forward and to prevent the backward flow of oil from the actuator port 4 or 5**.

It is not a practical solution to this problem to increase the force of the spring 82' in order to make up for the drop in the pressure on the back end 814' due to the leak of oil through the drain 9 because this will cause to increase the cracking pressure.

SUMMARY OF THE INVENTION

It is therefore an object of this invention in view of the above to provide an improved fluid control valve with an improved load check valve capable of dependably providing a pressure difference between the high-pressure port and the actuator port even in the presence of a drain between the outer walls of two of such control valves stacked in a layered structure such that backward motion of the actuator caused by a backward flow of high-pressure oil can be reliably prevented.

A fluid control valve embodying this invention, with which the above and other objects can be accomplished, may be characterized, like the prior art fluid control valve described above, as being adapted to be combined with another fluid control valve structured similarly to form a layered multi-directional control valve, say, by contacting outer walls of each with a drain formed therebetween, and comprising a high-pressure port connected to a high-pressure source, a tank port opened to a low-pressure region, an actuator port, a spool capable of connecting the actuator port selectively either to the high-pressure port or to the tank port, and a load check valve capable of blocking the passage of a fluid through the high-pressure port. The load check valve includes a poppet which encloses a spring chamber and is forwardly biased by a spring contained inside the spring chamber. The poppet is movable between a backward position and a forward position inside a valve-containing chamber which has an opening on a portion of the outer wall of the control valve but this opening is blocked by a portion of the outer wall of another similarly structured control valve. When the poppet is moved to its forward position, the poppet comes into contact with a seat disposed inside the high-pressure port to block it, but high-pressure oil on one side of the load check valve in the high-pressure port can flow into the spring chamber through an liquid inlet formed through the poppet. A pressure-communicating space is provided to the poppet into the spring chamber such that, when the poppet is at its backward position, the forces of a fluid acting from outside and inside on the poppet will cancel each other when the fluid pressure is equal on both sides of the load check valve. The pressure-communicating space may be formed by providing grooves either on the side of the poppet or on the side of the outer wall of the adjacent control valve which comes into contact with the poppet when the poppet moves to its backward position.

With fluid control valves according to this invention, too, the oil at the backward end part of the spring chamber does flow out through the drain, but the higher-pressure oil inside the spring chamber having the same pressure as inside the actuator port can easily move into the backward end part of the poppet because of the presence of the pressure-communicating space such that the effect of drain is canceled and hence that the oil pressure inside the spring chamber (or the oil pressure inside the actuator port) applies directly to the backward end part of the poppet.

Suppose the oil pressure inside the high-pressure port has become equal to the oil pressure inside the actuator port. Because of the presence of the pressure-communicating space according to this invention, however, the oil pressure at the backward end part of the poppet is equal to that inside the actuator port. Thus, the forward force on the poppet becomes equal to the backward force on the poppet, canceling each other as a whole. As a result, the only force acting on the poppet is the force of the spring which causes the poppet to close the high-pressure port 1. The load check valve can thus reflect faithfully the pressure difference between the high-pressure port and the actuator port, preventing a reverse flow of pressured oil due to the loads on the actuators.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIGS. 2A-2 and 2B-2 show bottom views of the same load check valve taken respectively along line 2A-2—2A-2 in FIG. 2A-1 and along line 2B-2—2B-2 in FIG. 2B-1, FIGS. 2A-1, 2A-2, 2B-1 and 2B-2 being together referred to as FIG. 2);

FIGS. 11A-1 and 11B-1 show sectional views of the prior art fluid control valve of FIG. 4 with actual oil flow and oil pressure and FIGS. 11A-2 and 11B-2 show bottom views of the same taken respectively along line 11A-2—11A-2 in FIG. 11A-1 and line 11B-2—11B-2 in FIG. 11B-1 (FIGS. 11A-1, 11A-2, 11B-1 and 11B-2 being together referred to as FIG. 11); and of different valves, are indicated by the same numerals (with or without a prime).

DETAILED DESCRIPTION OF THE INVENTION

An embodiment of this invention is described next with reference to FIGS. 1, 2A and 2B. Components which are basically the same as explained above with reference to a prior art control valve are indicated and referred to by the same numerals (without a prime "'") and may not be repetitively explained.

Figure 3:
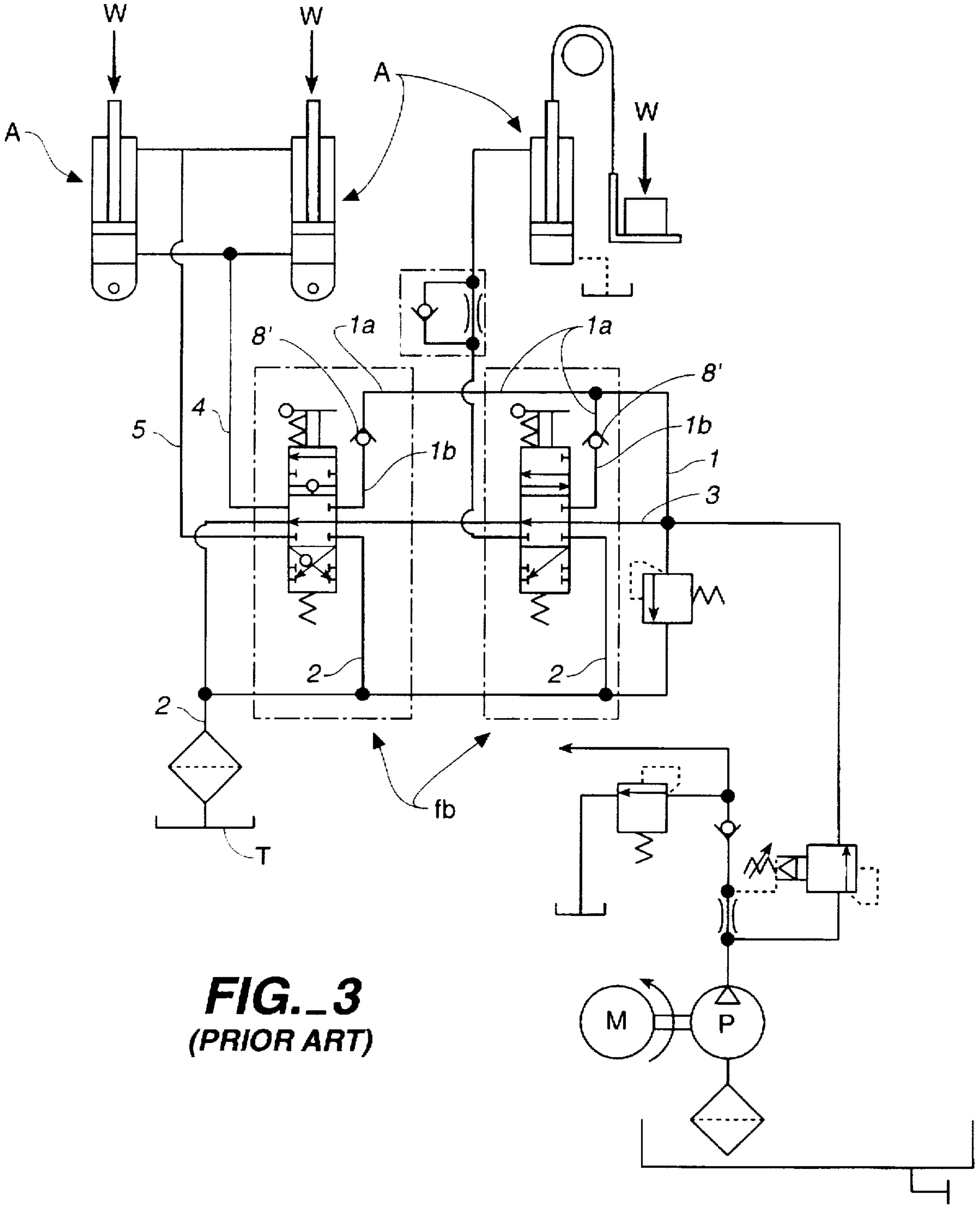
FIG. 3 (PRIOR ART)
FIG. 3 is a block oil pressure diagram of a pump system incorporating prior art fluid control valves.
Figure 4:
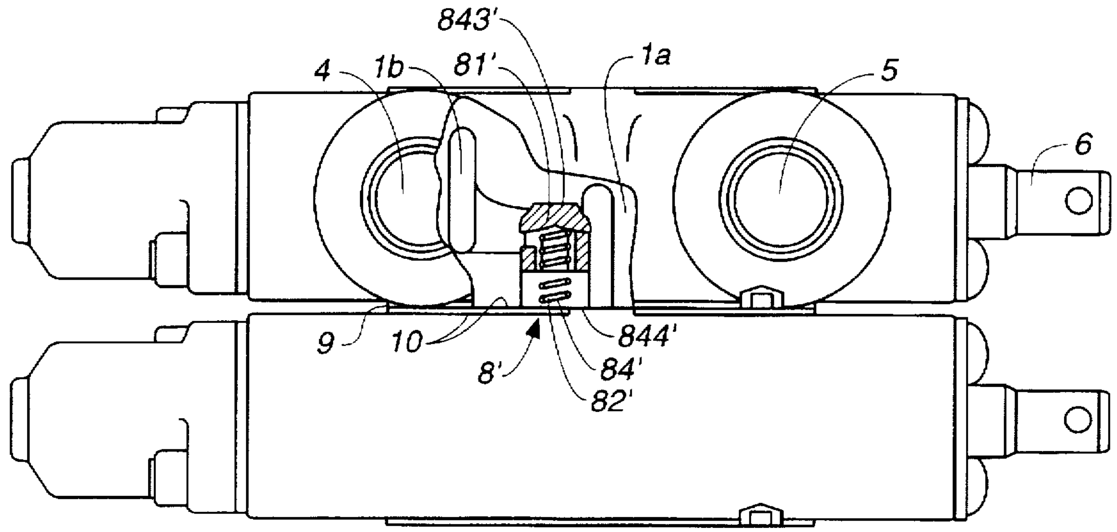
FIG. 4 (PRIOR ART)
FIG. 4 is a sectional view of the prior art fluid control valve incorporated in the system shown in FIG. 3.

A fluid control valve FB embodying this invention is also characterized as being a 4-port switch valve of the slide-spool type (with a slidable spool), having a high-pressure port 1 connected to a high-pressure source P and containing a load check valve 8, a tank port 2 connected to a low-pressure region T, a center bypass 3 which connects the high-pressure port 1 and the tank port 2, and a pair of actuator ports 4, 5, as shown in FIG. 3. Symbols 1*a* and 1*b* are used again to distinguish the portions of the high-pressure port 1 on the opposite sides of the load check valve 8. As shown in FIG. 4, it will be assumed that two of these control valves FB are stacked one on top of the other, or attached next to each other, with a drain 9 formed in between.

Figure 5:
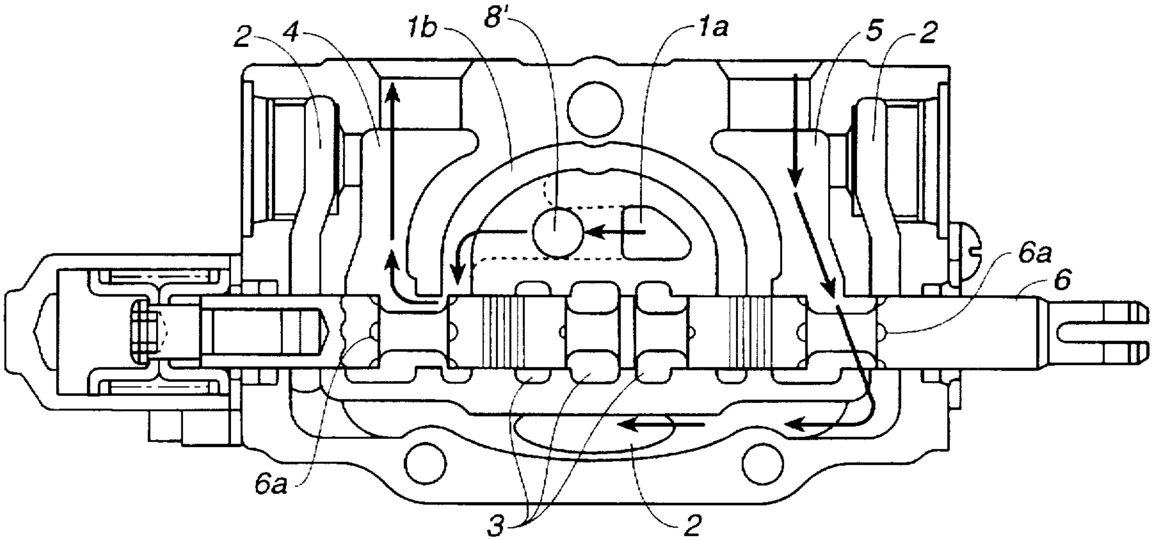
FIG. 5 (PRIOR ART)
FIG. 5 is a sectional view of the prior art fluid control valve of FIG. 4 when the spool is at the right-hand position.
Figure 6:
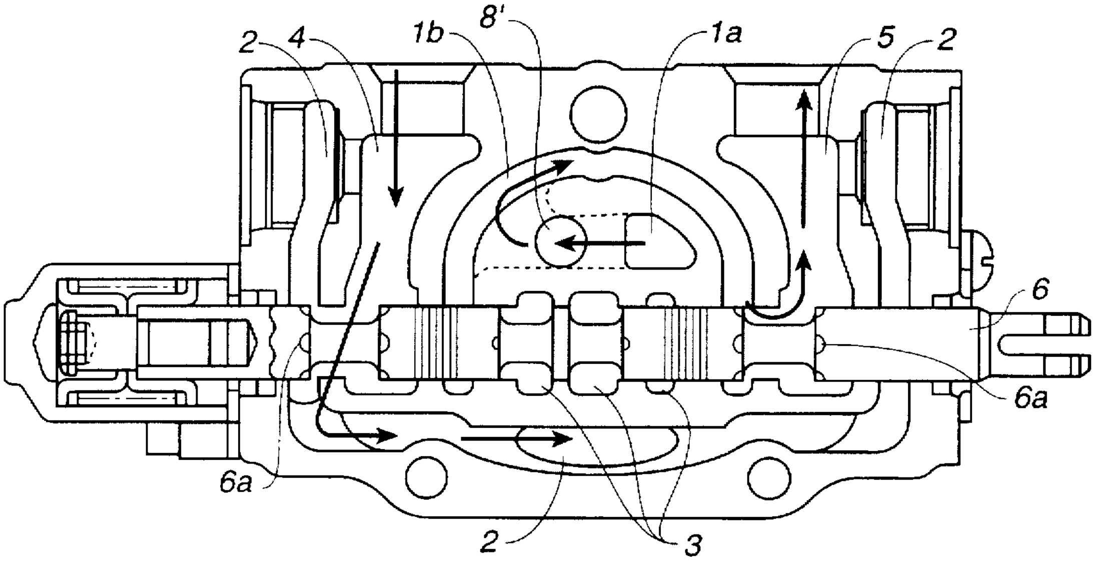
FIG. 6 (PRIOR ART)
FIG. 6 is a sectional view of the prior art fluid control valve of FIG. 4 when the spool is at the left-hand position.
Figure 7:
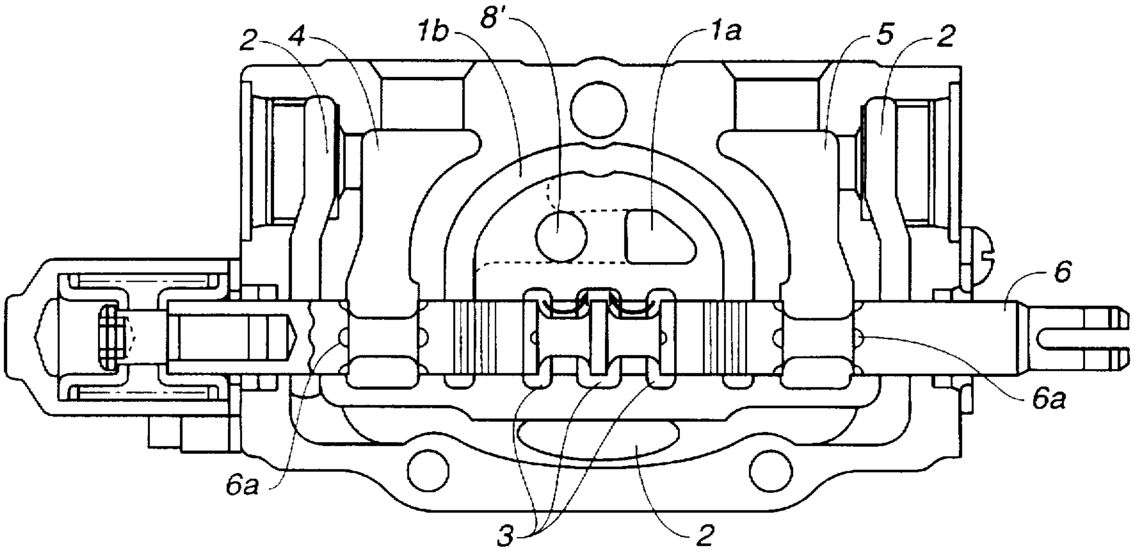
FIG. 7 (PRIOR ART)
FIG. 7 is a sectional view of the prior art fluid control valve of FIG. 4 when the spool is at the middle position.
Figure 8:
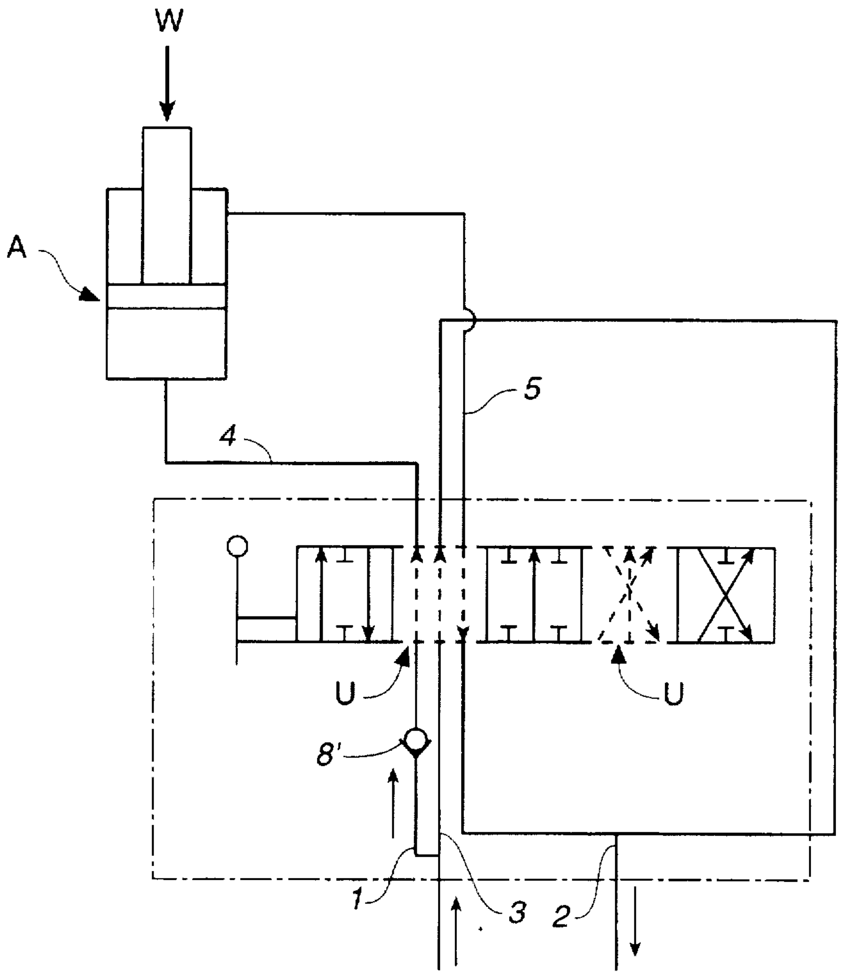
FIG. 8 (PRIOR ART)
FIG. 8 is a block oil pressure diagram of the prior art fluid control valve in a situation which can arise when the spool is moved from one to another position.
Figure 9A:
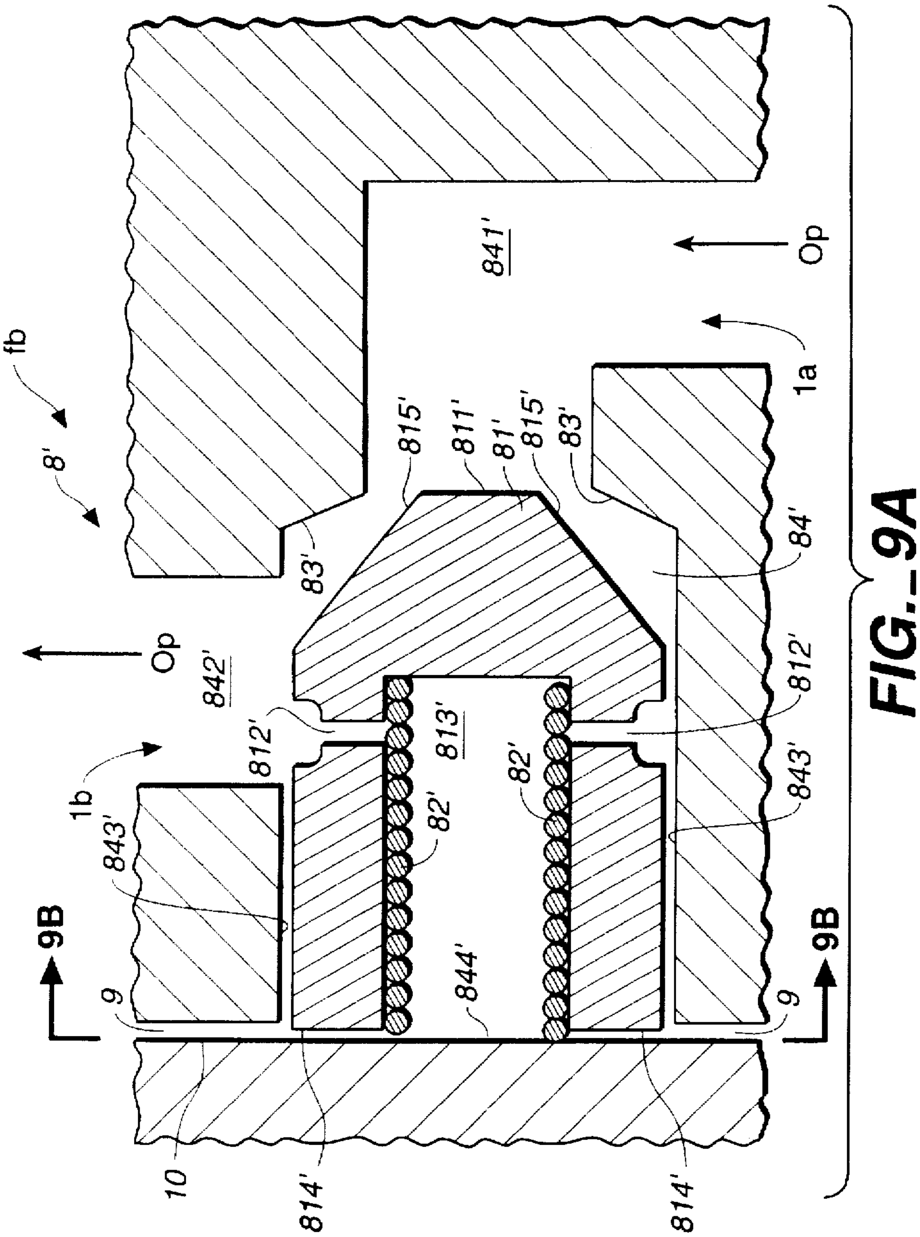
FIG. 9A (PRIOR ART)
FIG. 9A shows a sectional views of the prior art fluid control valve of FIG. 4
Figure 9B:
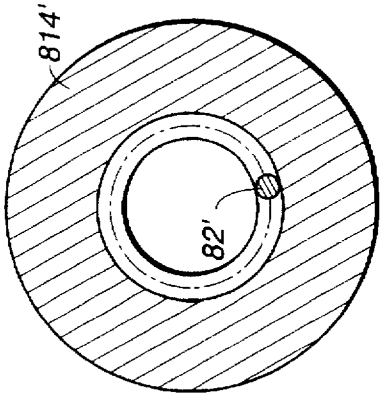
FIG. 9B (PRIOR ART)
FIG. 9B shows a bottom view thereof taken along line 9B—9B in FIG. 9A (FIGS. 9A and 9B being together referred to as FIG. 9)
Figure 10A:
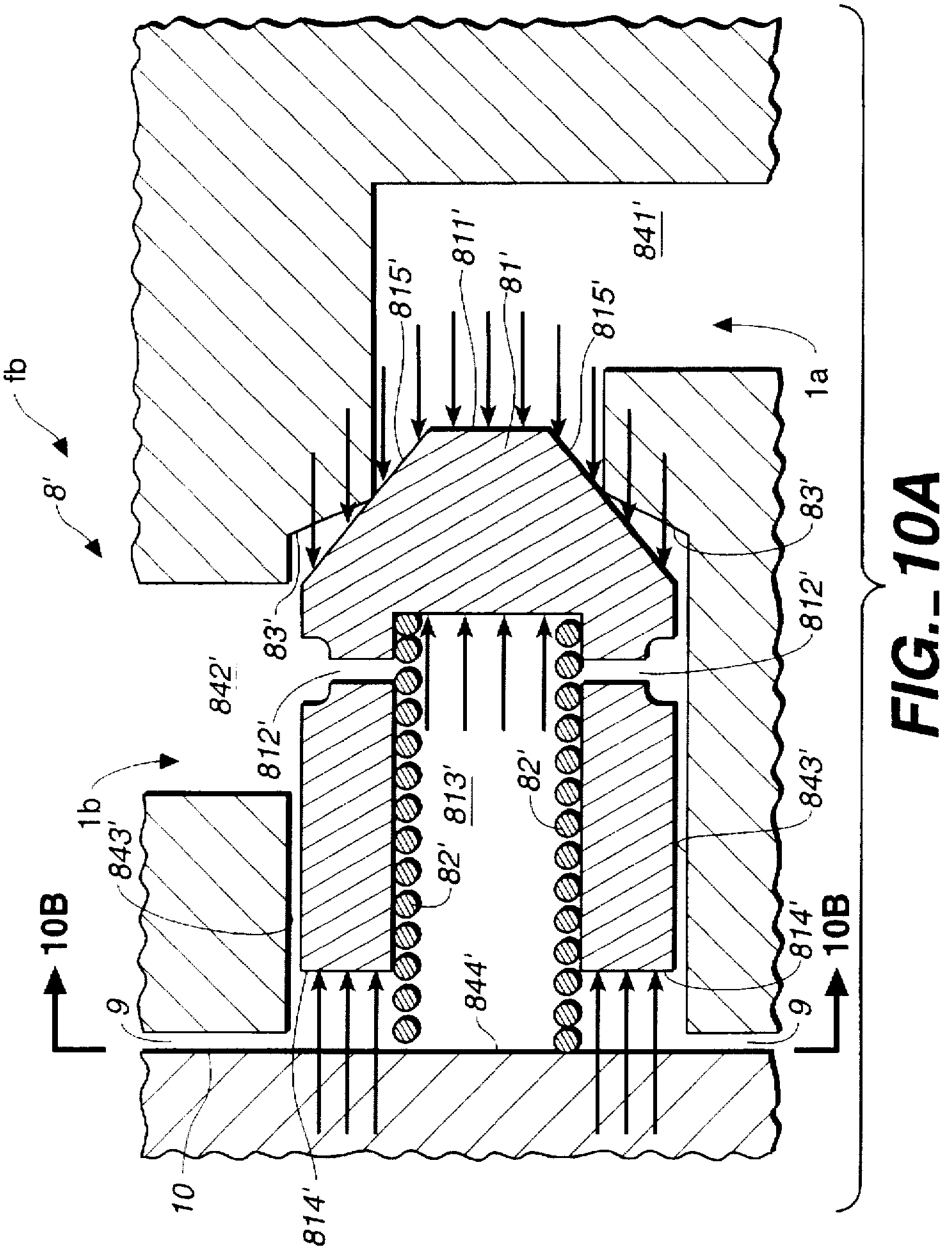
FIG. 10A (PRIOR ART)
FIG. 10A shows a sectional views of the prior art fluid control valve of FIG. 4 with the oil flow and oil pressure when the effects of the drain can be ignored and FIG. 10B shows a bottom view thereof taken along line 10B—10B in FIG. 10A (FIGS. 10A and 10B being together referred to as FIG. 10)
Figure 10B:
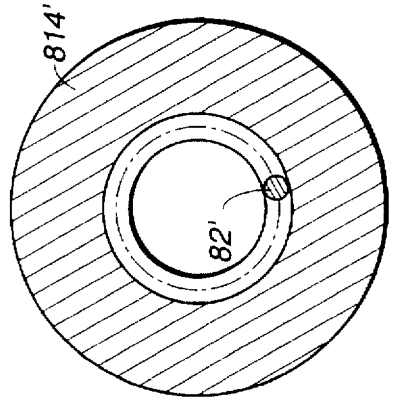
FIG. 10B (PRIOR ART)
Figures 1, 11A:
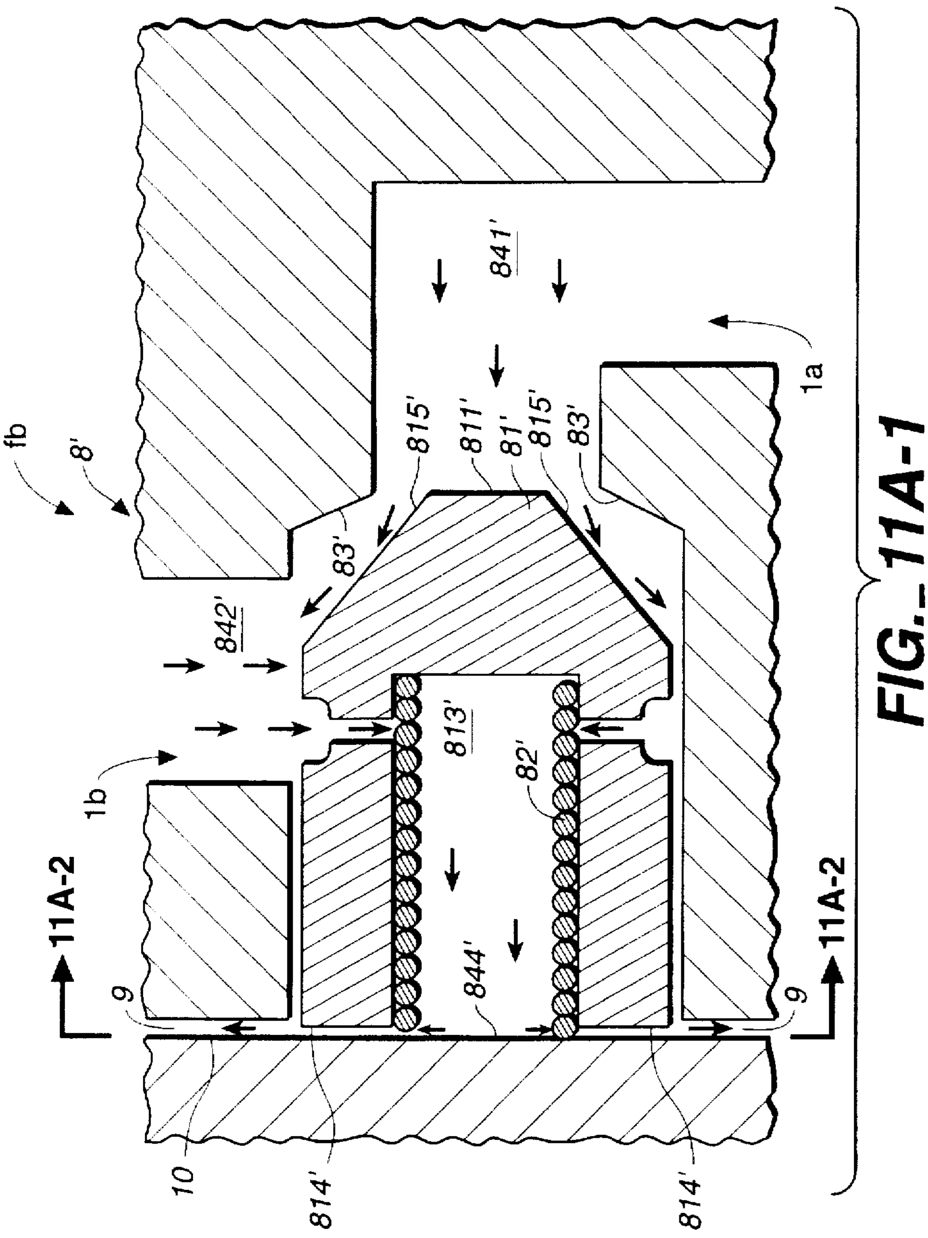
FIG. 11A-1 (PRIOR ART)
Figures 2, 11A:
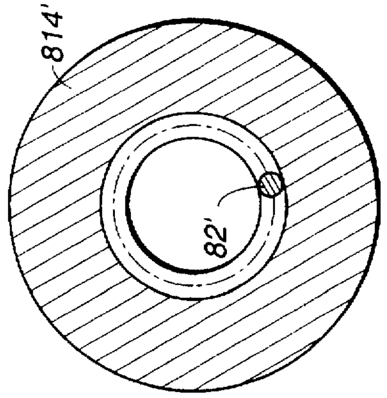
FIG. 11A-2 (PRIOR ART)
Figures 1, 11B:
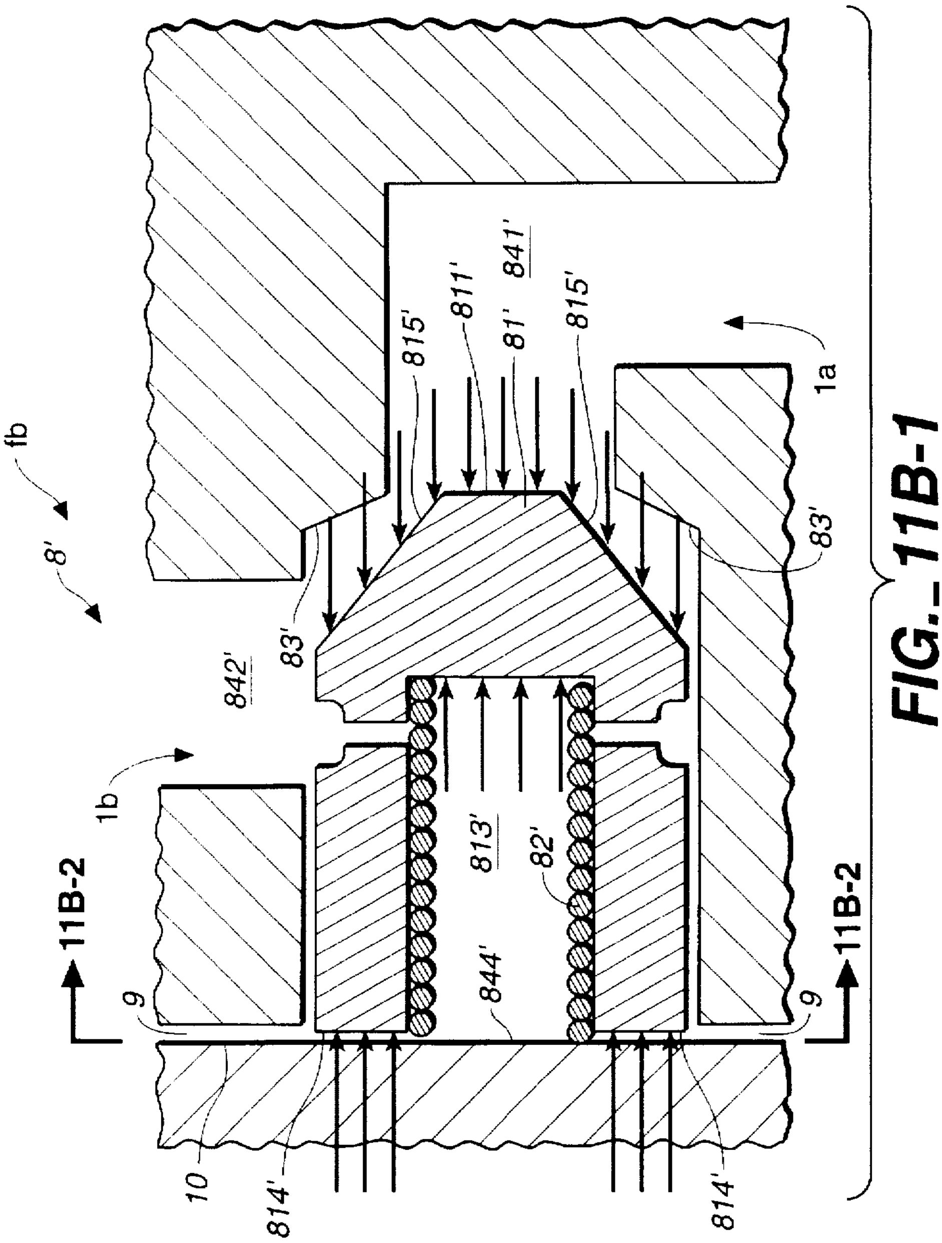
FIG. 11B-1 (PRIOR ART)
Figures 2, 11B:
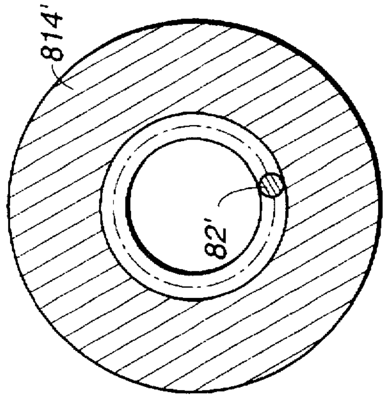
FIG. 11B-2 (PRIOR ART)

When the slidable spool 6 is moved to one side position (the right-hand side position as shown in FIG. 5), the center bypass 3 is closed, the high-pressure port 1 is connected to one of the actuator ports (the first actuator port 4) and the tank port 2 is connected to the other of the actuator ports (the second actuator port 5) such that the loads W on the actuators A are lifted. When the spool 6 is moved to the opposite side position (the left-hand side position as shown in FIG. 6), the center bypass 3 is closed, the high-pressure port 1 is connected to the second actuator port 5 and the tank port 2 is connected to the first actuator port 4 such that the loads W on the actuators A are lowered. When the spool 6 is at a middle position as shown in FIG. 7, the center bypass 3 is opened, and the actuator ports 4, 5 are blocked from the high-pressure port 1 and the tank port 2.

The load check valve 8 is accommodated within the high-pressure port 1 by providing an indentation 843 with an opening to a portion of an outer wall 10 of the control valve FB. This opening of the indentation 843 is blocked by a corresponding portion (a back wall 844) of the outer wall 10 of the adjoining control valve FB, such that a valve-containing chamber 84 is formed. A poppet 81 is disposed inside this chamber 84. When the chamber 84 is maintained at a high pressure, a high-pressure fluid is prevented by the poppet 81 from flowing into the input side 1*a* of the high-pressure port 1 but a portion thereof will flow out through the drain 9 formed between the mutually opposite outer walls 10 of the two mutually adjacent control valves FB.

Figure 1A:
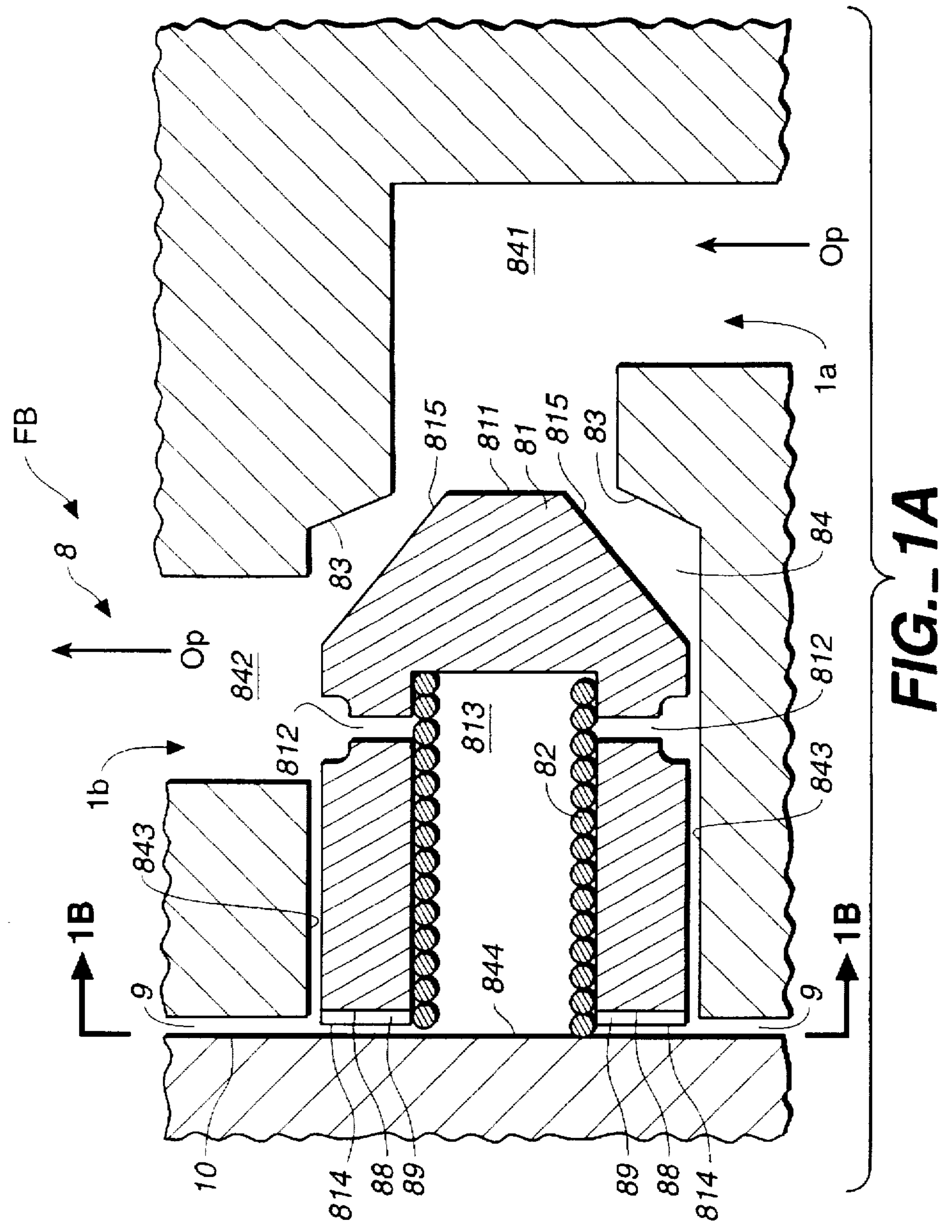
FIG. 1A shows a sectional view of a load check valve embodying this invention and FIG. 1B shows a bottom view thereof taken along line 1B—1B in FIG. 1A (FIGS. 1A and 1B being together referred to as FIG. 1)
Figure 1B:
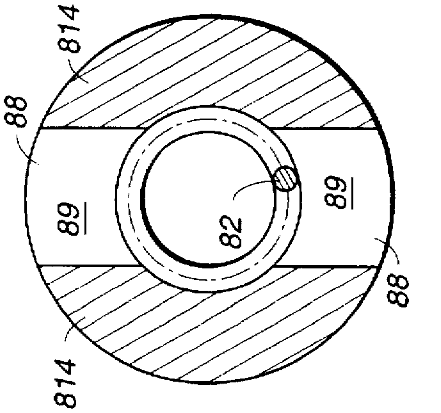
Figures 1, 2A:
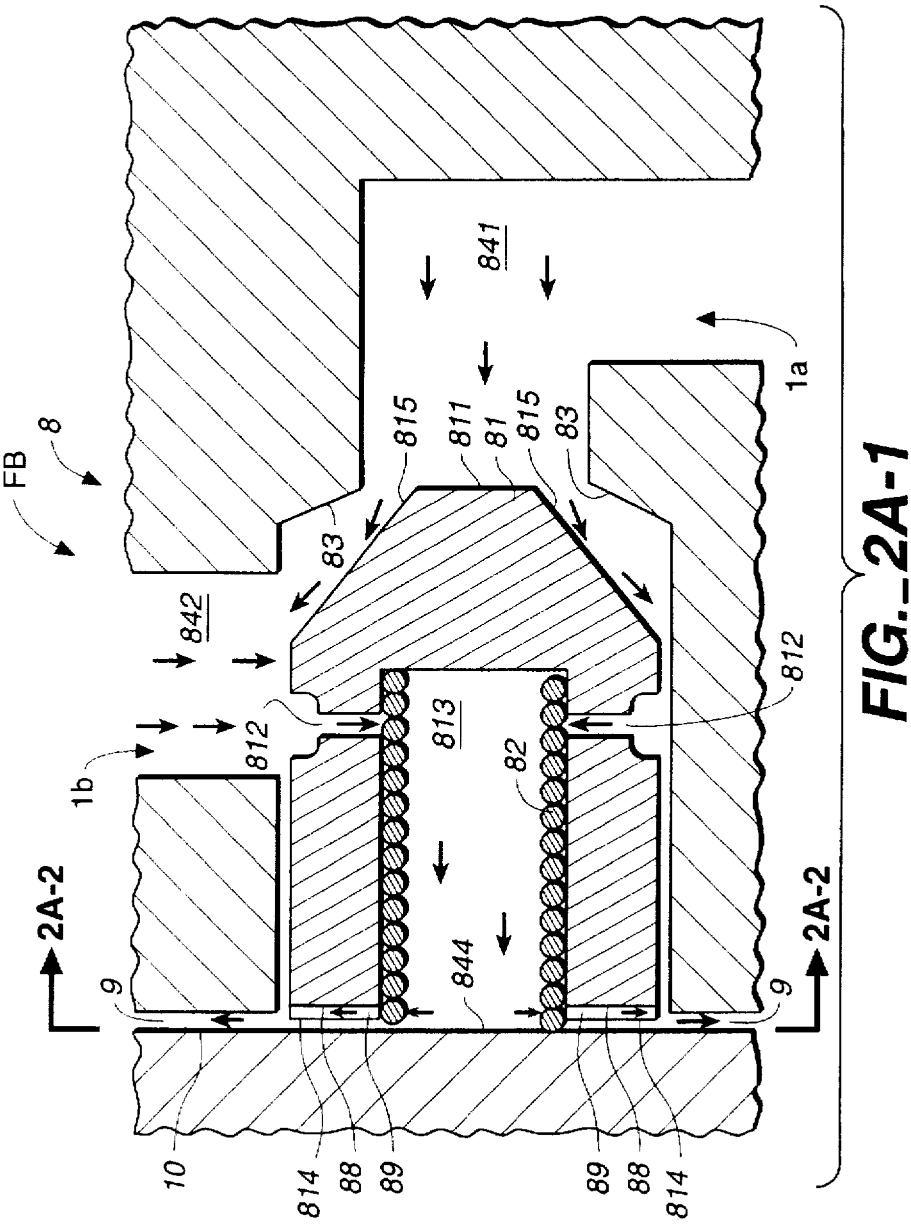
FIGS. 2A-1 and 2B-1 show sectional views of the load check valve of FIG. 1 for showing oil flow routes and oil pressure when the poppet is in the forward and backward positions, respectively.
Figures 2, 2A:
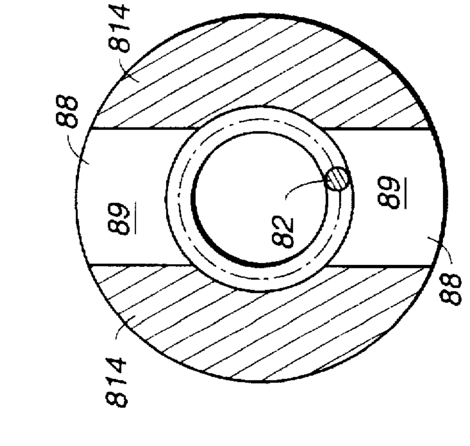
Figures 1, 2B:
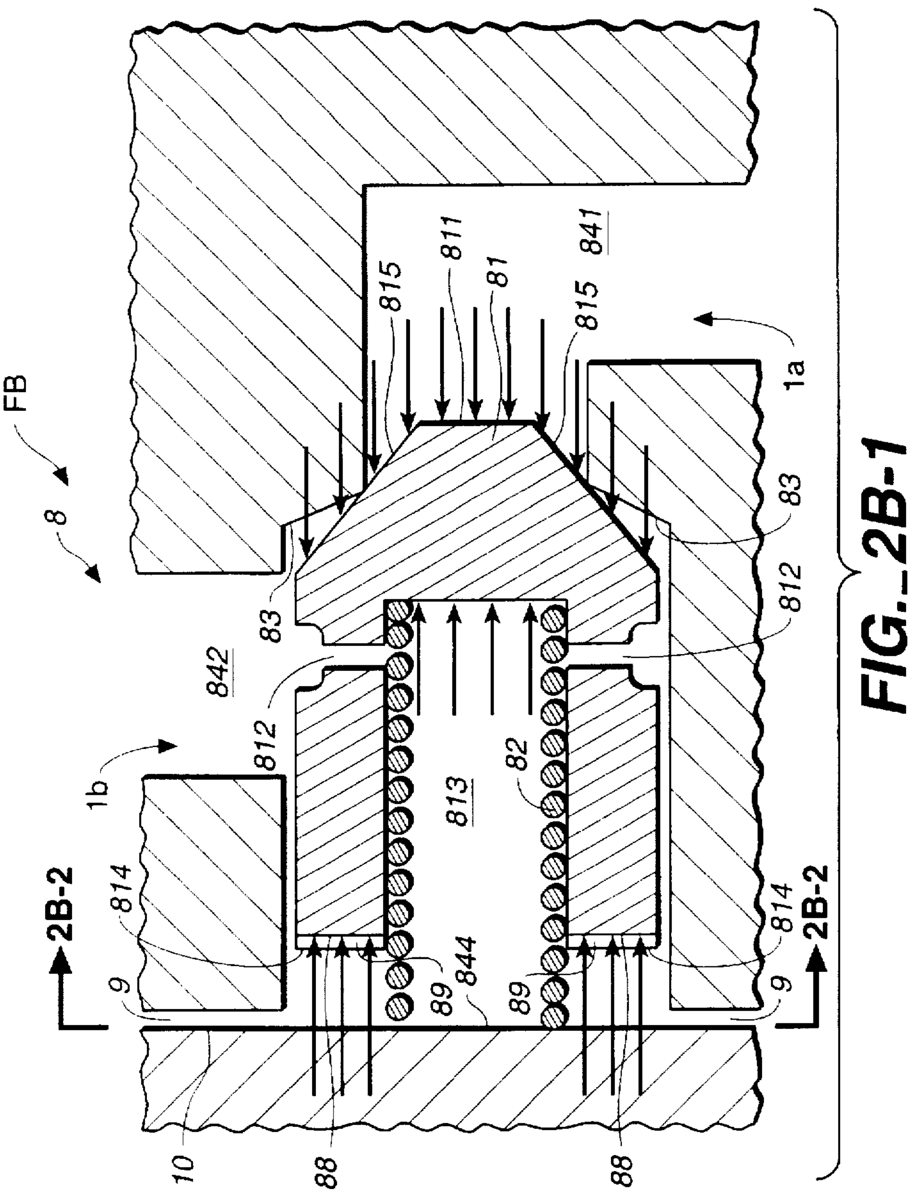
Figures 2, 2B:
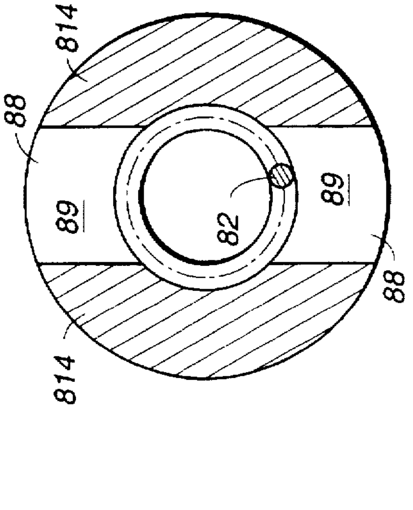

As shown in FIG. 1, the poppet 81 is movable backward and forward, comprising an approximately cylindrical body and an approximately conical front piece 811. The front piece 811 has in front a contact surface 815 which is carefully finished. The body defines therein a spring chamber 813 which connects the outlet side 1*b* of the high-pressure port 1 through a liquid inlet 812 and a back end surface 814 which is an annular plane formed by removing the circular bottom of the spring chamber 813 from the entire bottom surface of the body. Pressure-communicating grooves 88 are provided on the back end surface 814.

A spring 82 is contained in the spring chamber 813 and has one of its ends affixed to the back wall 844 and the other end in contact with the front piece 811 so as to provide a biasing force in the forward direction to the poppet 81. The valve-containing chamber 84 includes an inlet 841, which connects to the inlet side 1*a* of the high-pressure port 1 and has a carefully finished seat 83, and an outlet 842 which connects to the outlet side 1*b* of the high-pressure port 1 and hence to the actuator port 4 or 5. The seat 83 is adapted to come into contact with the contact surface 815 of the poppet 81 as they approach each other. The back wall 844 is adapted to form a pressure-communicating space 89 together with the pressure-communicating grooves 88 when the poppet 81 is in the backward position shown in FIG. 1.

As shown in FIG. 2A, oil at the back end surface 814 of the poppet 81 will flow out through the drain 9 but the pressure-communicating space 89 allows the high-pressure oil inside the spring chamber 813 having the same pressure as that inside the actuator port 4, 5 to easily move to the back end 814 of the poppet 81, thereby canceling the effect of the drain 9. As a result, the pressure inside the spring chamber 813, which is the same as the pressure in the actuator port 4, 5, is directly applied also to the back end surface 814 of the poppet 81.

Consider a moment at which the pressure inside the high-pressure port 1 and the pressure inside the actuator port 4, 5 have become equal in the fluid control valve FB. At this moment, the pressure at the back end surface 814 of the poppet 81 directly represents the pressure inside the actuator port 4 or 5 because of the pressure-communicating space 89. Thus, the force which pushes the poppet 81 forward is equal to the force which pushes the poppet 81 backward, and the only apparent force which acts on the poppet 81 is the biasing force of the spring 82. The poppet 81 is therefore pushed forward to close the high-pressure port 1. In summary, the load check valve 8 can reliably act according to the pressure difference between the high-pressure port 1 and the actuator port 4 or 5, preventing the backward flow of pressured oil due to the loads W on the actuators A.

In summary, the present invention provides a fluid check valve with an improved load check valve capable of reliably acting according to the pressure difference between the high-pressure port and the actuator port even in the presence of a drain such that backward motion of the actuators caused by a backward flow of pressured oil can be dependably prevented.

Figure 12A:
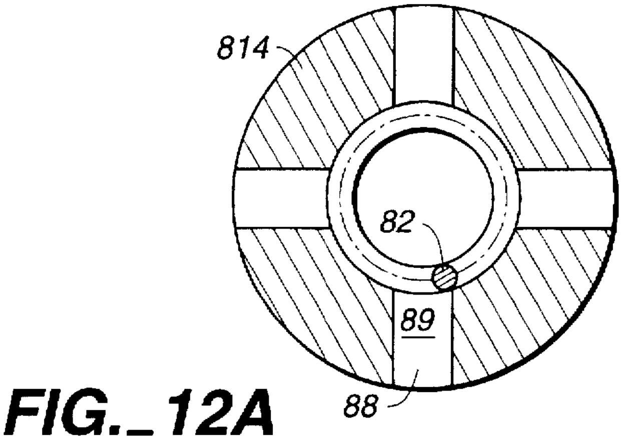
Figure 12B:
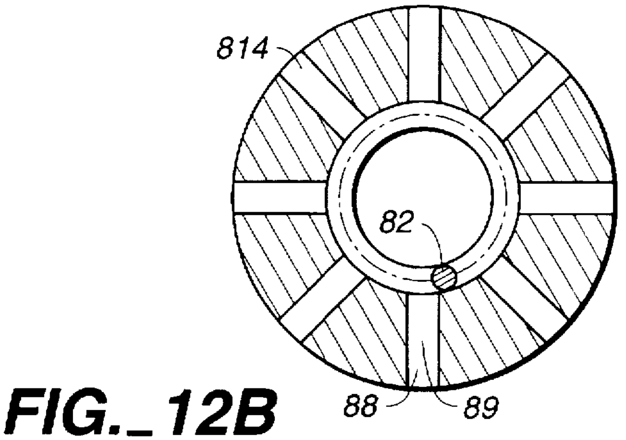
Figure 12C:
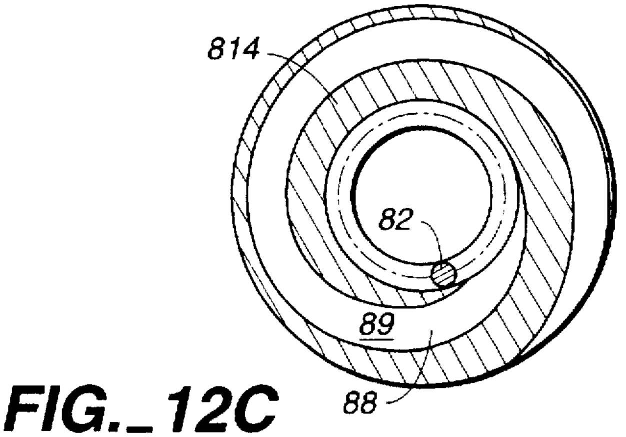

The invention has been described above with reference to only one embodiment, but this example is not intended to limit the scope of the invention. Many modifications and variations are possible within the scope of this invention. For example, what was referred to above as the pressure-communicating space need not be formed by grooves on the back end surface of the poppet but may be formed by grooves on the back wall 844 which contacts the back end surface of the poppet or by providing protrusions on the back end surface 814 of the poppet 81 or the back wall 844. The shape of such grooves is not required to be as shown in FIG. 1 but may be varied as long as the area is large enough to allow a flow of oil from the spring chamber 813 to the surface of the poppet 81. FIGS. 12A, 12B and 12C show some of the examples, FIGS. 12A and 12B showing examples where grooves are arranged radially and FIG. 12C showing an example with a spiral groove.

What is claimed is:

1. A check valve for being inserted between an inlet side and an outlet side of a fluid passage for blocking a fluid flow in said fluid passage, said check valve comprising:

a poppet-containing chamber having an opening on a portion of an outer wall and connected to said fluid passage where said inlet side and said outlet side are separated from each other;

a poppet which is disposed inside said poppet-containing chamber, said poppet being capable of moving backward to a backward position towards said opening and forward to a forward position towards said fluid passage, said poppet having a front piece with an externally facing contact surface and surrounding a spring-containing chamber, said contact surface being adapted to contact a seat formed in said fluid passage between said inlet side and said outlet side when said poppet is at said forward position and to thereby block a fluid flow between said inlet side and said outlet side, said contact surface being adapted to be separated from said seat when said poppet is at said backward position, said poppet having a liquid inlet connecting said spring-containing chamber and said outlet side, said poppet having a back end surface which is adapted to contact a back wall at said opening by leaving a groove between said back end surface and said back wall when said poppet is at said backward position and said back end surface is in contact with said back wall; and a spring contained inside said spring-containing chamber, one end of said spring contacting said front piece, said spring applying a biasing force on said poppet towards said seat;

wherein the forces of a fluid acting from outside and inside on said poppet cancel each other when the fluid pressure in said inlet side and the fluid pressure in said outlet side of said high-pressure port are equal.

2. The check valve of claim 1 wherein the other end of said spring contacts said back wall.

3. The check valve of claim 1 wherein said back wall is a portion of an outer wall of another valve.

4. A fluid control valve, which is one of a plurality of valve units structured similarly and designed to be stacked together with a drain in between to form a layered multi-directional valve, said fluid control valve comprising:

a high-pressure port connected to a high-pressure source and comprising an inlet side and an outlet side, said high-pressure port containing a seat between said input side and said output side;

a tank port opened to a low-pressure region;

an actuator port;

a spool capable of connecting said actuator port selectively either to said high-pressure port or to said tank port;

an outer wall; and a load check valve which comprises:

a poppet-containing chamber having an opening on a portion of said outer wall and connected to said high-pressure port where said inlet side and said outlet side is separated from each other;

a poppet which is disposed inside said poppet-containing chamber, said poppet being capable of moving backward to a backward position towards said opening and forward to a forward position towards said seat, said poppet having a front piece with an externally facing contact surface and surrounding a spring-containing chamber, said contact surface being adapted to contact said seat when said poppet is at said forward position and to thereby block a fluid flow between said inlet side and said outlet side, said contact surface being adapted to be separated from said seat when said poppet is at said backward position, said poppet having a liquid inlet connecting said spring-containing chamber and said outlet side, said poppet having a back end surface which is adapted to contact a back wall at said opening, there being left a groove between said back end surface and said back wall when said poppet is at said backward position and said back end surface is in contact with said back wall; and a spring contained inside said spring-containing chamber, one end of said spring contacting said front piece, said spring applying a biasing force on said poppet towards said seat;

wherein the forces of a fluid acting from outside and inside on said poppet will cancel each other when the fluid pressure in inlet side and the fluid pressure in said outlet side of said high-pressure port are equal.

5. The fluid control valve of claim 4 wherein the other end of said spring contacts said back wall.

6. The fluid control valve of claim 4 wherein said back wall is a portion of an outer wall of another fluid control valve which is similarly structured.

7. A layered multi-directional valve comprising at least two fluid control valves which are similarly structured and stacked adjacent each other by leaving a drain in between, each of said two fluid control valves comprising:

a high-pressure port connected to a high-pressure source and comprising an inlet side and an outlet side, said high-pressure port containing a seat between said input side and said output side;

a tank port opened to a low-pressure region;

an actuator port;

a spool capable of connecting said actuator port selectively either to said high-pressure port or to said tank port;

an outer wall; and a load check valve which comprises:

a poppet-containing chamber having an opening on a portion of said outer wall and connected to said high-pressure port where said inlet side and said outlet side is separated from each other;

a poppet which is disposed inside said poppet-containing chamber, said poppet being capable of moving backward to a backward position towards said opening and forward to a forward position towards said seat, said poppet having a front piece with an externally facing contact surface and surrounding a spring-containing chamber, said contact surface being adapted to contact said seat when said poppet is at said forward position and to thereby block a fluid flow between said inlet side and said outlet side, said contact surface being adapted to be separated from said seat when said poppet is at said backward position, said poppet having a liquid inlet connecting said spring-containing chamber and said outlet side, said poppet having a back end surface which is adapted to contact a portion of an outer wall of the other of said two fluid control valves disposed at said opening, there being left a groove between said back end surface and said portion of the other fluid control valve when said poppet is at said backward position and said back end surface is in contact with said back wall; and a spring contained inside said spring-containing chamber, one end of said spring contacting said front piece, said spring applying a biasing force on said poppet towards said seat;

wherein the forces of a fluid acting from outside and inside on said poppet will cancel each other when the fluid pressure in said inlet side and the fluid pressure in said outlet side of said high-pressure port are equal.

8. The layered multi-directional valve of claim 7 wherein the other end of said spring contacts said portion of the other fluid control valve.

* * * * *